July 6, 1943.  J. M. JOHNSON  2,323,605
COMBINED SWEEP RAKE AND STACKER
Filed Nov. 13, 1942  5 Sheets-Sheet 5
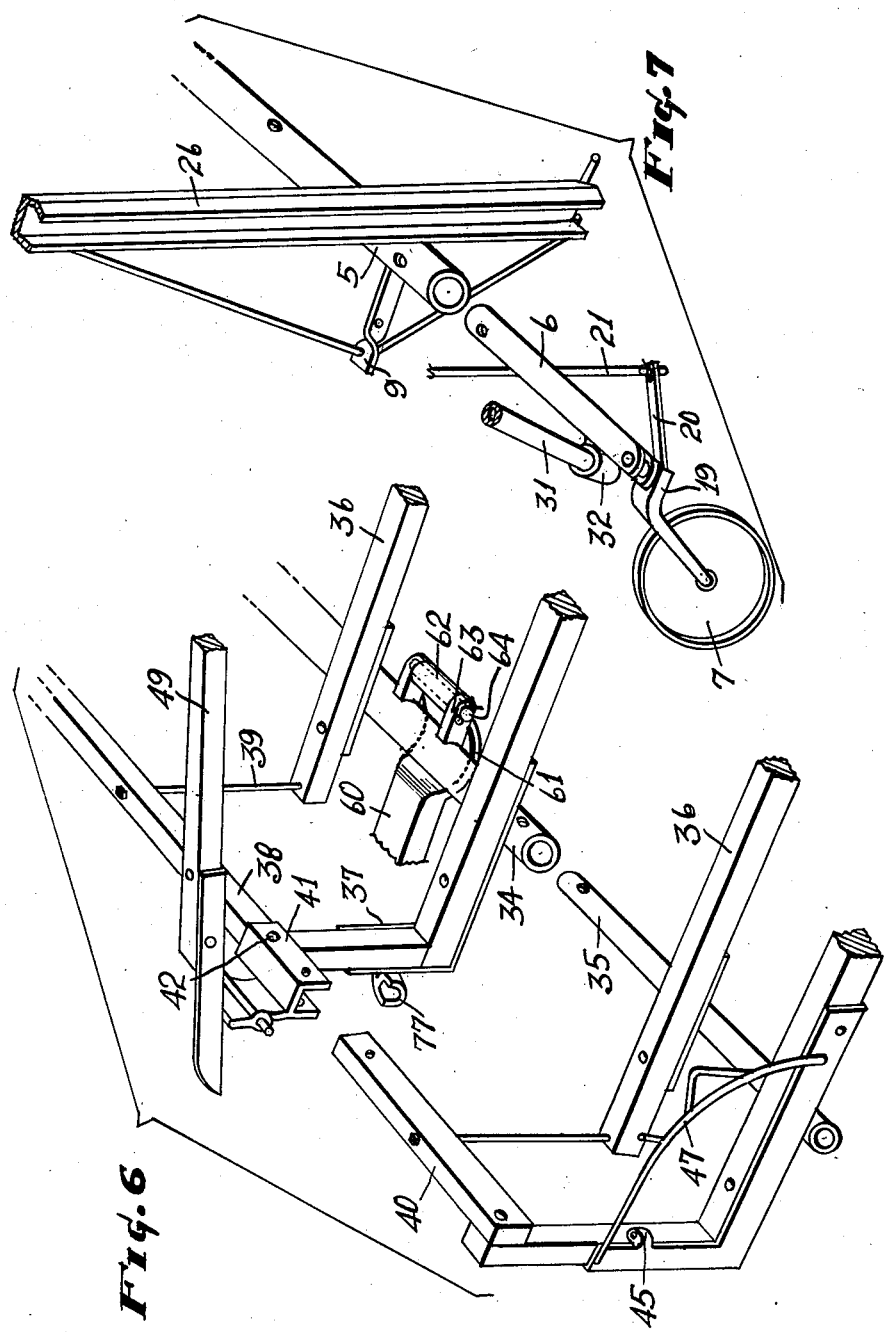
INVENTOR.
J. M. JOHNSON
BY Patented July 6, 1943

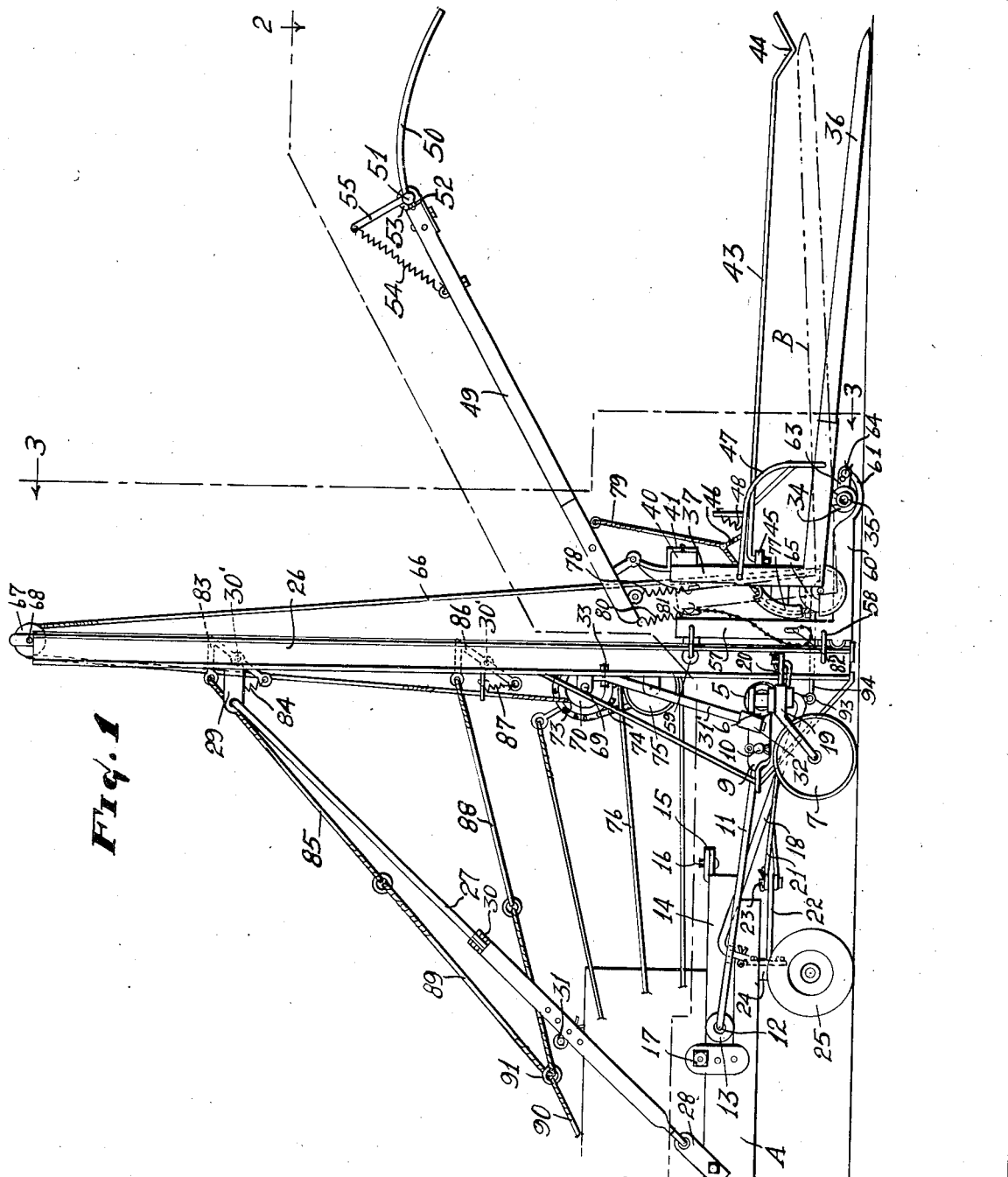

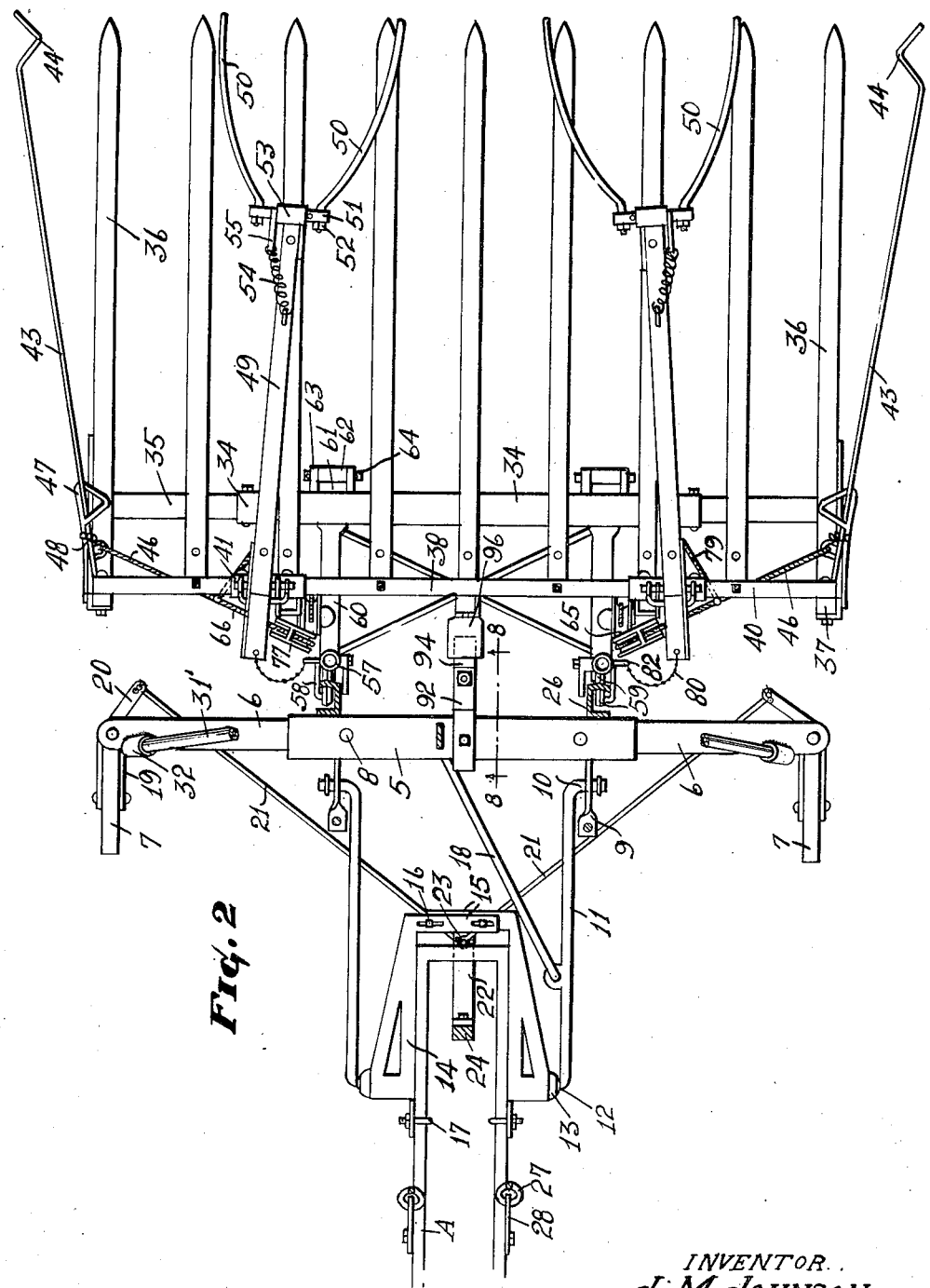

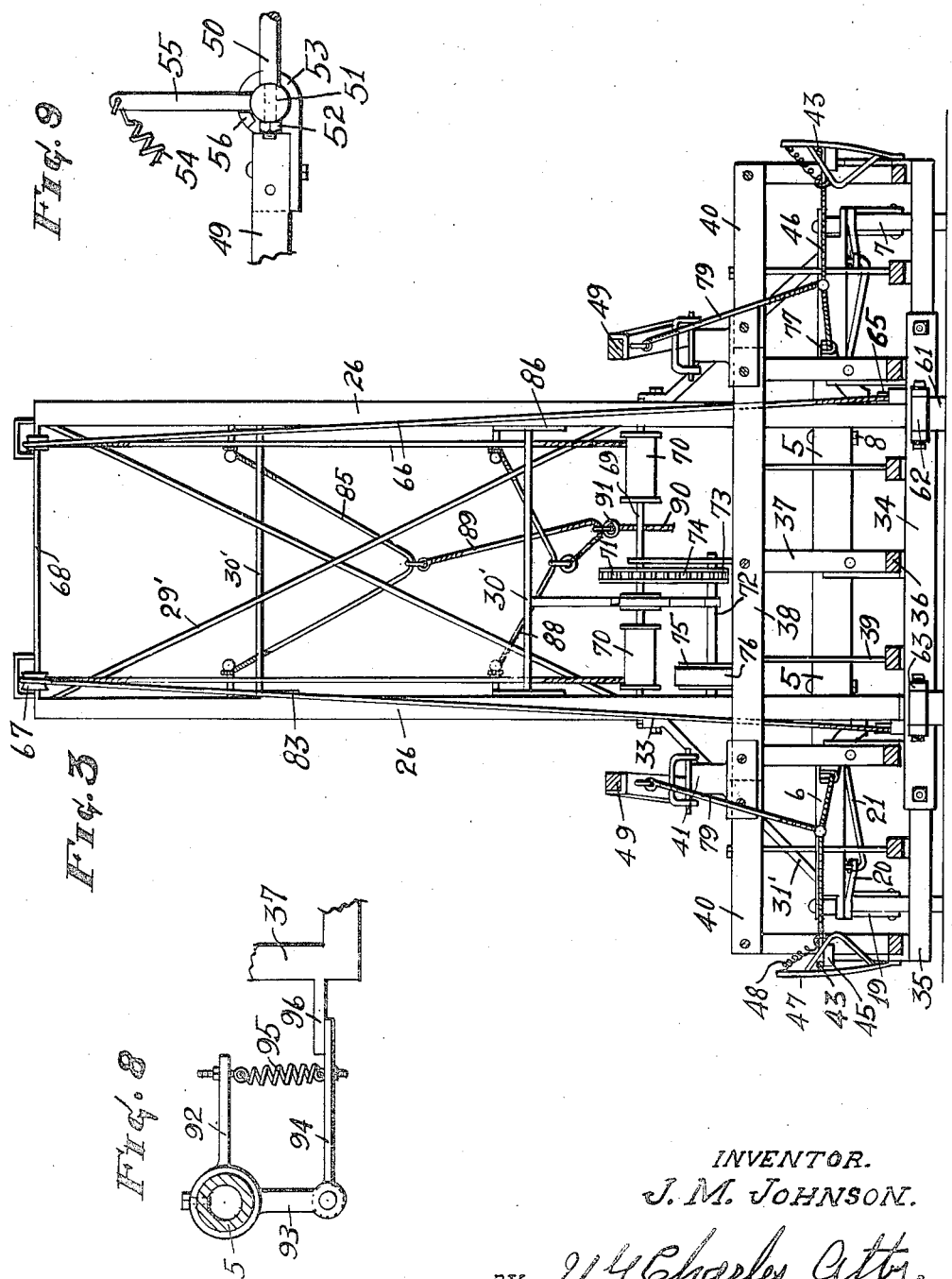

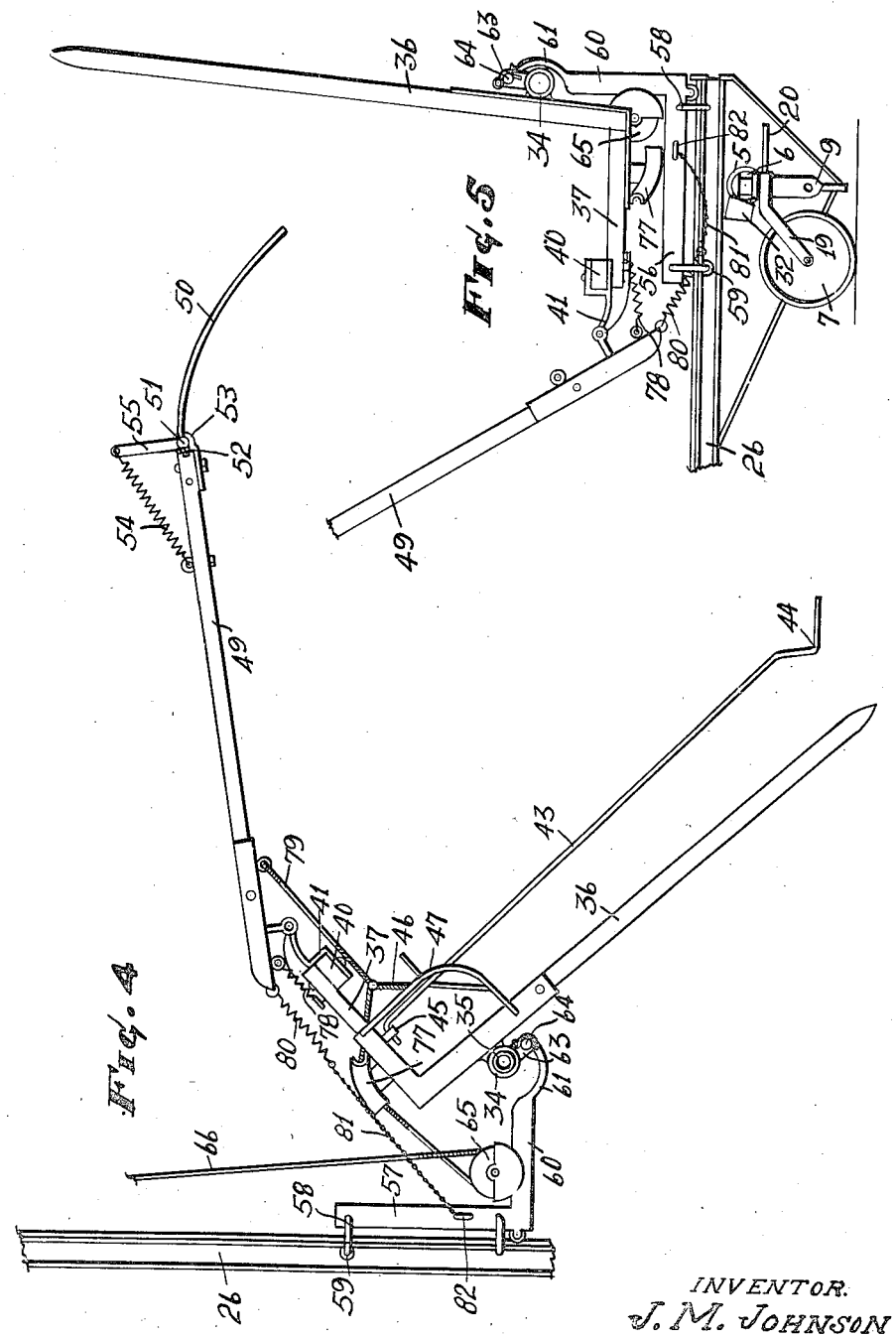

2,323,605

UNITED STATES PATENT OFFICE 2,323,605

COMBINED SWEEP RAKE AND STACKER

John Melvin Johnson, Lindsborg, Kans.

Application November 13, 1942, Serial No. 465,473

4 Claims. (Cl. 214—113)

This invention relates to agricultural machines and more particularly to agricultural machines known as sweep rake stackers.

The primary object of the invention is to improve generally the construction shown and described in my pending application, Ser. No. 403,582, filed July 22, 1941, now Patent No. 2,305,967, granted December 22, 1942.

An important object of the invention is to provide means whereby the frame of the machine may be reduced in width, so that it may be propelled along state roads, by complying with the usual regulation prohibiting machines having a width of more than eight feet, moving over the road surfaces.

Another object of the invention is to provide vertically movable pivoted arms operating above the rake proper, and adapted to prevent the material held on the rake from being blown from the rake as the rake is being elevated to a dumping position.

Another object of the invention is to provide means for automatically operating these load-gripping arms to release the load, when the rake is moved to its dumping position.

A still further object of the invention is to provide a sweep rake stacker, wherein the frame may be swung rearwardly and supported on the tractor for transportation from one place to another.

A still further object of the invention is to provide an adjustable clamping member for clamping the machine to various types of tractors, eliminating the necessity of providing an especially constructed attaching means for a particular tractor.

With the foregoing and other objects in view which will appear as the description proceeds, the invention consists of certain novel details of construction and combination of parts hereinafter more fully described and pointed out in the claims, it being understood that changes may be made in the construction and arrangement of parts without departing from the spirit of the invention as claimed.

Referring to the drawings:

Fig. 1 is a side elevational view of a sweep rake stacker, constructed in accordance with the invention.

Fig. 2 is a plan view of the stacker taken on line 2—2 in Fig. 1.

Fig. 3 is a sectional view taken on line 3—3 in Fig. 1.

Fig. 4 is a fragmental elevational view illustrating the position of the rake and load-securing arms when the rake is in its dumping position.

Fig. 5 is a view illustrating the frame of the machine as moved to a position for transportation from one place to another.

Fig. 6 is a fragmental perspective view illustrating the detachable end sections of the rake and manner of securing the end sections in position.

Fig. 7 is a fragmental perspective view illustrating the means for supporting the wheels of the frame of the sweep rake stacker.

Fig. 8 is an enlarged sectional view taken on line 8—8 in Fig. 2.

Fig. 9 is an enlarged fragmentary view of the fingers as connected to a vertical movable clamping arm.

Referring to the drawings in detail, the frame of the machine, comprises a main supporting member 5, which is approximately eight feet long and tubular in formation.

Telescoping end members 6 form a part of the main supporting member and provide supports for the wheels 7 mounted at the outer ends thereof. These telescoping end members are provided with openings that register with openings in the main supporting member 5 for the reception of a bolt 8, whereby the telescoping end sections may be held in various positions of adjustment so that they may be moved to positions as shown by Fig. 5 of the drawings, supporting the frame when it is being transported from place to place, or they may be moved to the positions as shown by Fig. 1 of the drawings, where they provide the support for the rake while in operation.

Brackets indicated at 9 extend from the main supporting member 5, at points adjacent to the ends thereof, and are provided with openings to receive the right-angled ends 10 of the supporting rods 11, providing a pivotal connection between the frame of the sweep rake stacker and a tractor.

The opposite ends of the supporting rods 11 are formed with heads 12 that are fitted in the sockets 13 formed in the side members 14 of the tractor coupling. These side members 14 are provided with co-operating bars 15 that slide one over the other, the bars being connected by means of the bolts 16 extending through elongated openings formed in the bars. Due to this construction, it will be seen that the side members 14 may be moved toward or away from each other, thereby adapting the connecting member for use in connection with tractors of various widths.

Bolts 17 also connect the side members 14 and are formed with hooked ends that hook over the usual flanged side rails of the tractor, used to propel the machine, the tractor in the present showing being indicated at A.

A brace rod 18 extends from one of the supporting rods 11, and also connects with the main supporting member 5 at a point intermediate the ends thereof, the brace rod 18 acting to prevent side sway of the machine with respect to the tractor propelling the machine.

Extending forwardly from each wheel shank 19 of the stacker is an arm 20 having its free end rockably connected to a connecting rod 21 which extends toward the center of the tractor where the rods from the stacker wheels meet. At this point the rods are pivotally connected to the end of a bracket 22 through the medium of a pin 23 extending through the eyes of the rods and through said bracket, said bracket being rigidly connected to the vertical supporting shaft 24 that supports the front end of the tractor on its wheels 25, said shaft being turned in the usual manner by the operator of the tractor as guiding means therefor. When the shaft is turned the wheels 7 of the stacker will likewise be directed in the same direction as the wheels of the tractor through the medium of the connecting rods, whereby a cramping condition of the frame of the stacker when turning may be relieved.

The frame of the machine also includes channel bars 26 that have connection with the main supporting member 5, at points adjacent to the ends thereof, said channel bars 26 extending in spaced parallel relation with respect to each other, as clearly shown in the drawings.

Under normal operating conditions, these channel bars are supported in upright position, as is shown by Fig. 1 of the drawings. Telescoping brace rods 27 connect with the plate 28 secured to side rails of the chassis of the tractor with which the device is used, the brace rods extending uprightly to points where they connect with the ears 29, extending rearwardly from the channel bars 26.

The telescoping brace rods 27 are provided with adjusting means, whereby the rods may be moved to support the channel bars 26 in various inclined positions, and at the same time permit the telescoping section of the brace rods to be disconnected so that the entire frame may be swung downwardly, the channel bars resting on the side members 14, to the end that the device may be readily transported from place to place. It will be seen in Fig. 1 that the adjusting means as above mentioned is through the medium of a clamp 30 integral with the upper end of the lower telescoping section to clamp the upper section therein, and furthermore a key 31 is provided to engage through openings provided in registry in said upper and lower sections, said upper section also having transverse openings whereby the lower section with plate 28 thereto attached may be turned a quarter of a circle to accommodate for attaching said plate 28 to a different type of tractor from that shown.

The channel bars are braced by diagonally positioned members 29' and rods 30' connecting one channel bar to the other whereby a rigid frame structure is provided. When the telescoping end members 6 are moved outwardly from its tubular member 5, the same are braced by a suitable rod 31', one end of said rod being slightly conical to wedge into a conical sleeve element 32 that is rigidly secured to the outer end of the telescoping end member 6, the rod slanting upward and having its upper end secured to a leg of the channel as at 33. It will be understood that when the telescoping end members 6 are moved inward for reducing the width of the frame the brace rods 31' will be removed and later replaced when the stacker is put in action.

It will also be noted that because of the telescoping end members 6, the end members may be moved inwardly to the limits of their inward movement, thereby reducing the width of the machine to approximately eight feet, or prescribed maximum width of a machine travelling over a public road.

The rake comprises a tubular support 34 that is approximately eight feet long, and telescoping end members 35, the end members being removably supported within the ends of the member 34 so that when transporting the machine from place to place, sections of the rake may be removed to meet the requirements of the laws governing the widths of machines moving over public roads.

The rake teeth 36 are secured directly to the tubular support 34 and telescoping end members 35, there being provided right-angled members 37 extending from the inner end of certain of the teeth, the right-angled end members being connected by a bar 38 which braces the teeth against twisting movement. Rods 39 connect certain of the teeth with the bar 38, as clearly shown by the drawing. Each telescoping end member 35 provides a support for two of the teeth, the bar 38 having removable end portions 40 that are held to the ends of the bar 25 by means of the brackets 41 that fit over the adjacent ends of the bar 38 and end portions 40, where they are bolted in position, by means of the bolts 42. Thus it will be obvious that when it becomes necessary to dismantle the machine for transportation, the removable end section of the rake may be readily removed by removing the bolts which connect the end sections to the main portion of the rake.

Inwardly movable arms indicated at 43 are mounted at the ends of the rake, and extend in parallel relation with the teeth of the rake, the arms having their outer ends extended inwardly and outwardly as at 44, to engage the load supported on the rake, and to hold the load against lateral movement or spilling, the other end of each arm being connected to an ear 45 that is integral with its right-angled end member 37. The movable arms are moved inward by a pull of a cable 46, which is done when the stacker has been loaded. Said arms also move downward through the medium of a loop arrangement 47 which directs the arms in said downward direction. To retain the arms outwardly when the rack is empty, springs 48 are provided, one end of each spring being connected to the arm a spaced distance inward from its rockable connection end, the other end of the spring being secured to the loop arrangement 47.

Vertically movable clamping arms 49 have pivotal connection with the bar 38, and are provided with spring fingers 50 at their outer ends, the arms, together with their spring fingers, adapted to extend over the top of the load of material on the rake, holding the material on the rake against displacement by wind pressure or otherwise. It will be noted that there are two fingers for each arm 49. Each finger has one end engaging through a square aperture adjacent each end of a short shaft 51 and being secured therein by a nut 52 threadedly engaging on the end of said finger, said shaft adapted to rock in a bearing 53 that is secured to the outer end of said arm 49. To retain the fingers upward there is provided a spring 54, one end being secured to an upwardly extended arm 55 secured to the shaft 51, the other end being secured to clamping arm 49. A detent 56 is integral with one end of the bearing to function as a stop for said upwardly extended arm 55.

The reference character 57 designates a vertical member of carriages for the rake, said carriages moving longitudinally of the channel bars and being held to the channel bars by means of curved arms 58 that fit over the channel bars and rollers 59 at each end of the vertical member of the carriage. The leg of the channel against which the rollers engage is V-shaped and the peripheral contour of the rollers corresponding to their respective side of the leg whereby side movement of the carriages is eliminated.

Each carriage includes a forwardly extended arm 60, said arms 60 having curved forward ends 61 and a sleeve 62 secured thereto, said sleeve engaging between forwardly extended ears 63 that are integral with the tubular support 34, said sleeve being rockably secured between the ears by a pin 64, providing a removable support for the rake to the end that should it be desired to disconnect the rake from the main frame of the machine, it may be readily accomplished by removing the pin 64. It will be understood that said connection of the arms 60 to the tubular support 34 is means to provide for tilting the rake to discharge the load of material placed thereon.

Mounted on the forwardly extended arms 60 are pulleys 65 over which the cables 66 operate, the cables also passing over the pulleys 67 mounted on the shaft 68 that connects the upper end of the channel bars 26.

Supported in bearings near the lower ends of the channel bars 26 is a shaft 69 on which the drums 70 are mounted. The cables 66 are wound on these drums when the rake is elevated, and allowed to play off of these drums as the rake is lowered.

Sprocket 71 is secured to the shaft 69 and receives motion from a power shaft 72 through a sprocket 73 and chain 74, the shaft 72 receiving its motion for the pulley 75 operated by the belt 76 which in turn is operated by the engine of the tractor with which the stacker is used.

It will, of course, be understood that the power is transmitted to the drums through a suitable clutch mechanism not shown in the drawings, so that in lowering the rake the clutch mechanism may be used to retard the downward movement of the rake after it has dumped its load.

The opposite ends of the cables 66 extend through guides 77 mounted on the rake proper, and extend to the side edges of the rake where they are connected with the inwardly movable arms 43, near the pivot ends thereof. Thus it will be seen that when the cables 66 are wound on the drums, the arms 43 are pulled inwardly against the load on the teeth of the rake.

As clearly shown by Fig. 4 of the drawings, the brackets 41 provide the supports for the clamping arms 49, and coiled springs 78 are connected with the clamping arms and brackets to normally urge the clamping arms upwardly out of contact with the load, held on the teeth of the rake.

Cables indicated at 79 connect with the cables 66 at points adjacent to the upper ends thereof, the cables 79 being connected with the clamping arms 49, at points in advance of their pivot points, so that when the cables 66 are drawn taut, the arms will be pulled downwardly into engagement with the load held on the teeth of the rake.

Inasmuch as the cables 79 are connected with the cables 66, it will be obvious that movement of the clamping arms to their clamping positions will be entirely automatic when the rake has been elevated to the limit of its upward movement on the frame of the machine.

It will be noted that the cables 66 extending downward from the pulleys 67 at the upper end of the channel bars engage over the forward sides of the pulleys 65, around the lower side, and upward at the rearward side of the pulley. Being so arranged, cables 66 are under a lesser strain than when wound on the pulley in the opposite direction from that shown.

Coiled springs 80 are secured to the inner ends of the clamping arms, and also have connection with the cables 81 that in turn are secured to the carriages 57 as at 82. Thus it will be seen that when the rake is tipped to its dumping position, the movement of the clamping arms will be cushioned, and limited, as the rake moves away from the clamping arms, or moves to a position as shown by Fig. 5 of the drawings.

It is obvious that when the rake is again swung upwardly the tension of the springs 80 will act to return the clamping arms to their elevated positions.

Pivotally mounted near the upper ends of the channel bars 26 are pivoted latch members 83 which are urged to their active positions by means of the springs 84. These latch members lie in the path of travel of the carriages 57, so that as the carriages move past the latch members they will automatically move to positions to support the weight of the rake and the contents thereof when the main operating cables are slackened. A cable indicated at 85 connects the latch members at opposite sides of the main frame of the machine. Latch members 86 are also supported on the channel bars 26 in spaced relation with the first mentioned latch members, the latch members 86 acting also to support the rake and contents thereof for dumping purposes, in the initial steps of forming the haystack. The latter latch members are held in their active or supporting positions by means of the coiled spring 87 and are moved to their inactive positions by means of the cable 88 which has connection with the latch members.

The reference character 89 designates a connecting cable, that connects the cables 88 and 85, there being provided rings at the ends of the cable 89 through which the cables 88 and 85 extend. A main control cable indicated at 90 is also provided with a ring 91 at one end thereof through which the cable 89 is extended. Thus it will be seen that due to this construction, when the cable 90 is pulled, the cables 81 and 85 will also be pulled operating the latch members to move the latch members to their inactive positions, allowing the rake to fall or slide to the bottom of the frame of the machine under its weight.

In the operation of the machine, the rake supporting frame is secured to a tractor in a manner as described. The rake of course at the beginning of operation will be in a position near the lower end of the frame, and disposed in such an angle that it will readily pick up material to be raked as the machine is moved over the ground surface. Fig. 8 shows the arrangement to retain the rake at such angle, said arrangement consisting of a forwardly extending arm 92 and a downwardly extending arm 93 secured to said supporting frame 5 intermediate its ends, the lower end of said arm 93 having a plate 94 rockably connected thereto, said plate extending forward and beneath the arm 92, and being connected at their outer ends by an adjustable spring 95. Said plate 94 extends forward a short distance from the connection of the spring to function as a rest for an extension plate 96 that is integral with the right-angled members of the rake.

When the rack is filled, the clutch mechanism is engaged to wind the cables 66 on the drums 70, elevating the rake to a position to be engaged by the latch members 86, where the rake and load are supported. When it is desired to discharge the load, cables 66 are slackened, with the result that the rake tilts forwardly under the load carried, thereby discharging the same. The gearing is now set in motion with the result that the cables are again wound on the drums, and as the cables 66 become taut, the rake tilts rearwardly, elevating the outer or free end of the rake, so the the pointed ends of the teeth of the rake will not dig into the ground surface as the machine is being moved over the ground, this position of the rake being illustrated by dotted lines B in Fig. 1.

Because of the fact that the cables that connect with the arms 49 also connect with the cables 40, it will be seen that as the cables 66 are tightened, arms 32 are drawn into engagement with the load, holding the load against displacement under wind pressure. Simultaneously with the above action, movable arms 43 are moved inwardly against the sides of the load to hold the load against tilting laterally from the rake. These arms 43 are also released, as the cables 66 become slack, to release the rake to dump its load.

With the rake in its uppermost position, the latch members 83, engaging under the carriages, will support the weight of the rake and its load. The gearing is released and the weight of the load carried by the rake will tend to tilt the rake, allowing the material thereon to slide to a pile directly in from the machine. As the teeth of the rake move downwardly, the arms 49 move gradually upwardly, releasing the load.

Having fully described my invention what I claim as new and desire to secure by Letters Patent is:

1. A combined sweep rake and stacker, comprising a wheel-supported frame adapted to be coupled to a power device, a pair of spaced uprights mounted on the frame, a pivoted rake mounted for movement longitudinally of the uprights, removable end sections forming a part of the rake and adapted to be disconnected from the main portion of the rake, whereby the width of the rake may be reduced, and a pair of vertically movable load-engaging arms mounted on the rake and adapted to automatically disengage the load on the rake when the rake is dumped, means for elevating the rake, and means for temporarily supporting the rake at the upper end of the frame.

2. A combined sweep rake and stacker, comprising a frame including a main supporting bar, parallel uprights secured to the supporting bar, means for securing the frame to a power device, telescoping brace rods extending from the power device and having connection with the uprights at points near the upper ends thereof, said frame adapted to swing downwardly resting on the power device, when the telescoping brace rods are swung downwardly, wheels mounted on the ends of the main supporting member, means for adjusting the wheels for contact with the ground surface when the frame is moved either to its upright or horizontal position, and a movable rake carried by the frame and adapted to move longitudinally thereof.

3. A combined sweep rake and stacker, comprising a frame, including a main support, parallel uprights secured to the main support, rake carriage movable vertically over the uprights, a rake pivotally mounted on the carriages, yielding means to retain the forward end of the rake downward when hay is being gathered, means for elevating the carriages and rake, said means embodying cables connected to the rake and extending over the upper ends of the uprights, said cables having sliding connection with the carriages whereby the free end of the rake will be tilted upwardly when the cables are tightened to elevate or lower the rake, and clamping arms mounted on the rake and to which the cables are connected, and said arms adapted to move into engagement with material on the rake as the cables are drawn tight in operating the rake.

4. A combined sweep rake and stacker, comprising a wheel-supported frame adapted to be coupled to a power device, means extending from the wheels to the power device to guide the wheels simultaneously with the guiding of the power device, a pair of spaced channel bars mounted on the frame, said frame including a main supporting member, telescoping end members forming a part of the frame and diagonal brace rods connecting the end members with the channel bars, a rake mounted for vertical sliding movement on the uprights, horizontally swinging arms on the rake and adapted to engage the sides of a load on the rake, holding the load against lateral movement from the rake, a pair of vertically movable arms mounted on the rake, said arms each having a pair of outwardly extending fingers, said arms adapted to engage the top of the load, holding the load against displacement by wind pressure, and means for holding the latter arms against movement as the rake swings downwardly, dumping its load.

JOHN MELVIN JOHNSON.